Feb. 14, 1950

G. A. SIMS 2,497,472

AUTOMOBILE LIFT

Filed Feb. 23, 1945

Inventor
Grover A. Sims,

By McMorrow & Berman
Attorneys

Feb. 14, 1950 G. A. SIMS 2,497,472
AUTOMOBILE LIFT
Filed Feb. 23, 1945 2 Sheets-Sheet 2
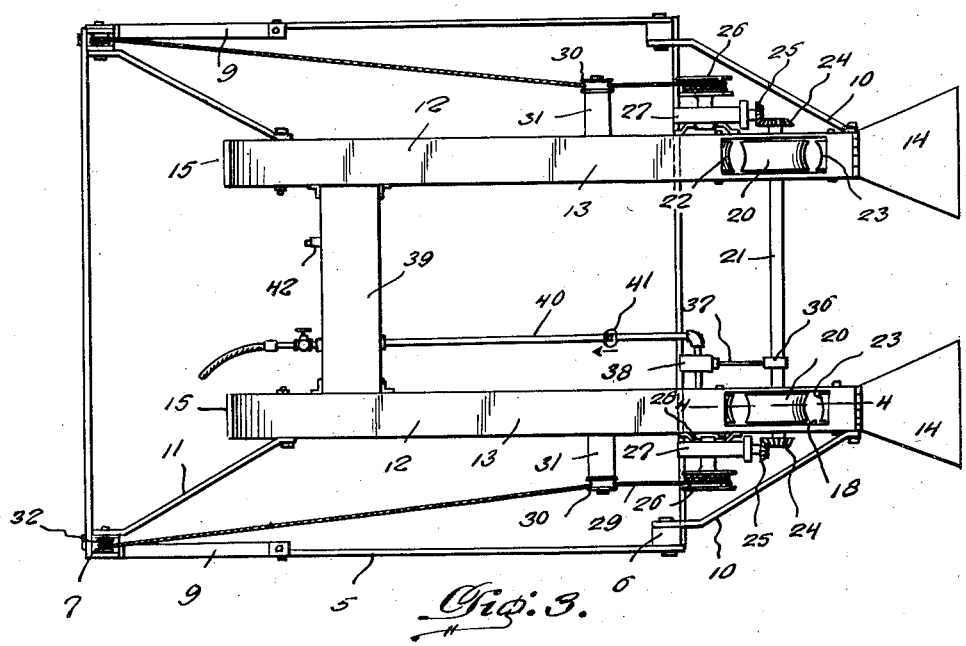
Fig. 3.
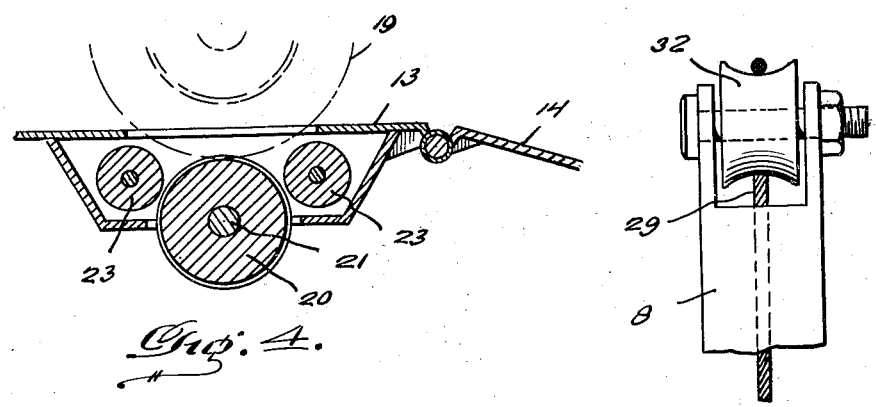
Fig. 4.
Fig. 5.
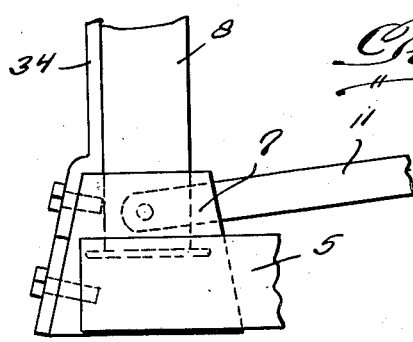
Fig. 6.
Inventor
Grover A. Sims,
By McMorrow and Berman
Attorney Patented Feb. 14, 1950

2,497,472

UNITED STATES PATENT OFFICE 2,497,472

AUTOMOBILE LIFT

Grover A. Sims, Beaumont, Tex.

Application February 23, 1945, Serial No. 579,383

4 Claims. (Cl. 254—91)

The present invention relates to new and useful improvements in automobile lifts of a type generally used by garages, service stations and the like for raising the automobile into an elevated position while lubricating or servicing the chassis thereof and the invention has for its primary object to provide a lift of this character operated by the drive wheels of the automobile supported on the lift.

An important object of the present invention is to provide a lift operating mechanism of this character operated by the drive wheels of an automobile supported on the lift for moving the lift into an elevated position and at the same time providing a compressed air pump also driven by the wheels of the automobile during the raising movement of the lift to provide a supply of air under pressure.

More specifically, the invention includes a base having front and rear lift arms pivotally attached to the base and connected to a frame or runway for supporting the wheels of an automobile and a pair of cable winding drums carried by the frame for winding a cable thereon to cause a lifting of the arms and frame through the medium of rollers driven by the wheels of the automobile.

It is accordingly an object of the present invention to provide an automobile lift of this character in which the automobile provides the necessary power to raise and lower the lift and thus enable use of the device in places where other power means is inaccessible.

A still further object of the invention is to provide an apparatus of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 3 is a top plan view.

Figure 4 is a fragmentary sectional view of the rollers operated by the drive wheels of an automobile and taken substantially on a line 4—4 of Figure 3.

Figure 5 is an enlarged elevational view of the pulley at the upper end of the lift post, and Figure 6 is an enlarged fragmentary elevational view of the connection between the lower end of the post and the base.

Figure 1:
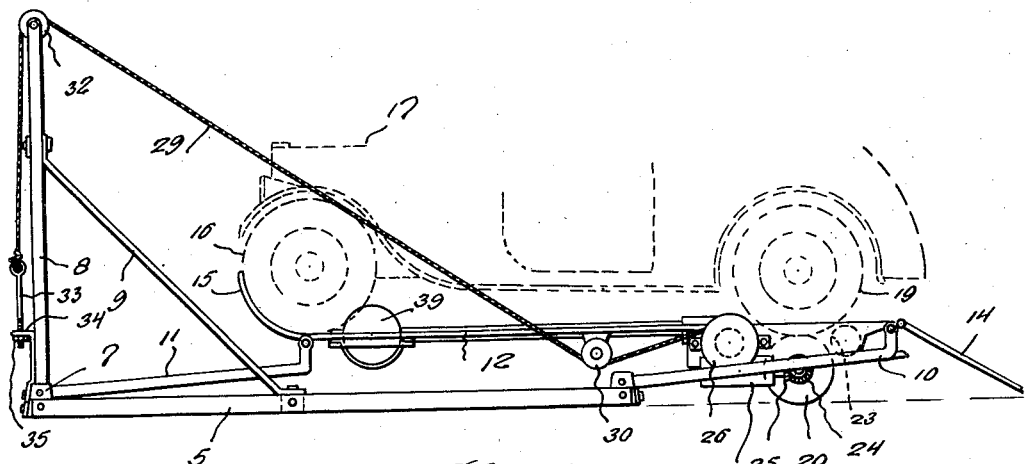
Figure 1 is a side elevational view showing the lift in its lowered position.

Referring now to the drawings in detail wherein for the purpose of illustration I have disclosed a preferred embodiment of the invention, the numeral 5 designates a base in the form of an open frame, the ends of the frame having blocks 6 secured thereto and the front corners of the frame also having blocks 7 secured thereto.

A pair of posts 8 rise from the blocks 7 at the front corners of the frame or base 5. Braces 9 extend from an intermediate portion of the side members of the frame 5 upwardly to a point adjacent the top of the posts 8.

A pair of lift arms 10 are pivoted to the rear blocks 6 and a pair of lift arms 11 are likewise pivoted to the front blocks 7, the arms 10 and 11 being inclined inwardly and are pivotally attached to the opposite sides of a lift frame designated generally at 12, adjacent the rear and front portions, respectively, of the latter.

The lift frame 12 comprises a pair of spaced parallel tracks or runways 13 having ramps 14 pivoted at the rear ends thereof and having upwardly extending stops 15 at the front ends thereof adapted for engagement by the front wheels 16 of an automobile 17 when driven onto the runway.

The rear portion of the tracks or runways 13 are formed with openings 18 adapted to partially receive the rear wheels 19 of the automobile for engaging channel-shaped rollers 20 secured to the ends of a shaft 21 journaled in the sides of the tracks or runways 13 and extending transversely of the lifting frame.

Front and rear idler rollers 22 and 23 are also journaled in the sides of the tracks or runways 13 to prevent forward or rearward movement of the automobile when the rollers 20 are driven by the rear wheels thereof.

To each end of the shaft 21 is secured a beveled gear 24 driving a similar gear 25 which is operatively connected to a drum 26 through gearing (not shown) in a gear housing 27 secured to the outer side of each of the tracks or runways 13 by means of brackets 28 or the like.

A cable 29 is arranged for winding on the drum 26, the cable extending forwardly of the lift 12 under a guide roller 30 secured to the side of the lift frame 12 by means of a bracket 31 and the cable then extends upwardly and over a pulley 32 journaled in the top of the posts 8 and then downwardly for attaching to an adjusting screw 33 attached to a bracket 34 secured to the lower portion of the post. The screw is provided with a lock nut 35 for securing the screw in vertically adjusted position whereby to regulate the tension of the cable 29.

Each side of the lift is provided with a drum and cable and operating means therefor as above explained. Posts 8 are longer than lift arms 10 and 11 and drums 26 are mounted on the end portion of the lift frame remote from the posts so that, when the lift frame is lowered, the cables incline downwardly to the end portion of the lift frame remote from the posts and are thus effective to apply a lift component to this remote end portion of the lift frame to facilitate level raising of the frame when the cables are wound on drums 26.

In the operation of the device, as the rear wheels 19 of the automobile are driven the rollers 20 will be rotated whereby to cause a winding of the cable 29 on the drum 26 and thus exert a pulling force on the cables 29 and produce an upward pivotal movement of the lift arms 10 and 11 to raise the frame 12.

Figure 2:
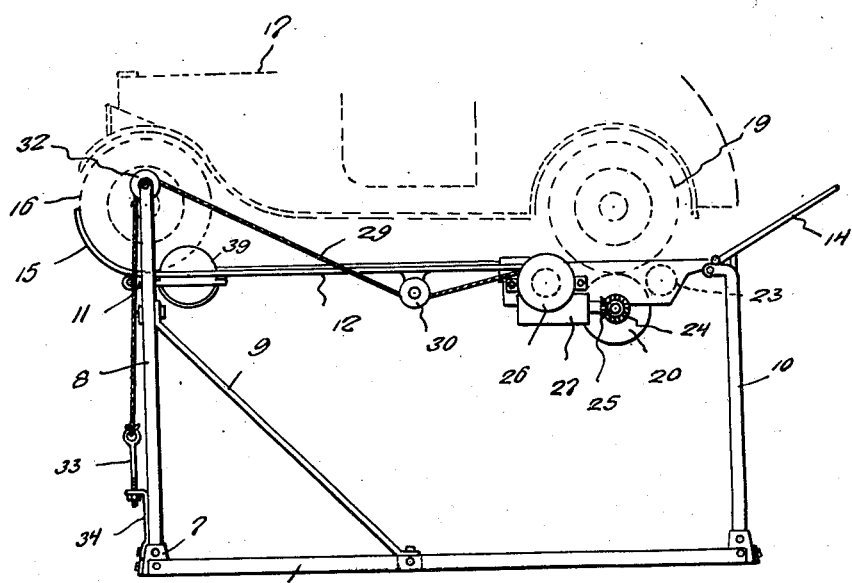
Figure 2 is a similar view showing the lift in its raised position.

Accordingly, the lift frame 12 with the automobile supported thereon will be raised from the position shown in Figure 1 of the drawings to the position shown in Figure 2 for supporting the automobile in an elevated position.

Also operatively connected to the shaft 21 is an eccentric 36 for operating a pump rod 37 leading to an air pump 38 attached to the lift frame 12, the pump being attached to a compressed air tank 39 by means of a pipe 40 for compressing air in the tank. The tank extends transversely between the tracks or runways 13 and forms a brace for the front ends thereof.

A check valve 41 is mounted in the pipe 40 and a safety valve 42 is provided for the tank 39.

Accordingly, as the shaft 21 is rotated by the rear wheels 19 of the automobile while the lift frame 12 is being raised the air pump 38 will also be operated to supply compressed air to the tank 39 which may be utilized for inflating the tires of the automobile or for other useful purposes.

When it is desired to lower the lift frame 12 the rear wheels 19 of the automobile are placed in reverse and then operated by the engine of the automobile to reverse the direction of rotation of the rollers 20 and thus unwind the cable from the drum 26.

In view of the foregoing description taken in connection with the accompanying drawings it is believed that a clear understanding of the construction, manner of operation and advantages of the device will be readily understood by those skilled in the art. A more detailed description thereof is accordingly deemed unnecessary.

It is to be understood, however, that even though I have herein shown and described a preferred embodiment of my invention, that the same is susceptible to certain changes fully comprehended by the spirit of the invention as herein described, and the scope of the appended claims.

Having thus described the invention, what I claim is:

1. An automobile lift of the class described comprising a substantially open frame constituting a base, a pair of rear lift arms pivotally attached at the rear end of said frame, a pair of front lift arms pivotally attached at the front end of said frame, a pair of posts rising from the front end of said frame, a lift frame including a pair of spaced parallel tracks pivotally attached at its front and rear ends to said front and rear lift arms, respectively, a shaft extending transversely at the rear end of said tracks and journaled therein, rollers secured on said shaft and adapted for engagement by the drive wheels of a motor driven vehicle supported on said tracks, a pair of drums journaled on the end portion of said lift frame remote from said posts, means drivingly connecting said shaft with said drums, pulleys journaled on the upper ends of said posts, cables having one end adapted for winding on said drum and extending upwardly over said pulleys and downwardly therefrom, and adjustable means for attaching the other ends of said cables to said base, said cables exerting a lifting force on the lift frame upon the operation of said rollers by the drive wheels of the automobile.

2. An automobile lift of the class described comprising a substantially open frame constituting a base, a pair of rear lift arms pivotally attached at the rear end of said frame, a pair of front lift arms pivotally attached at the front end of said frame, a pair of posts rising from the front end of said frame, a lift frame including a pair of spaced parallel tracks pivotally attached at its front and rear ends to said front and rear lift arms, respectively, a shaft extending transversely at the rear end of said tracks and journaled therein, rollers secured on said shaft and adapted for engagement by the drive wheels of a motor driven vehicle supported on said tracks, a pair of drums journaled on the lift frame forwardly of the rollers and operatively connected to said shaft, pulleys journaled on the upper ends of said posts, cables each having one end adapted for winding on said drum and extending upwardly over said pulleys and downwardly therefrom, means for attaching the other end of said cables to said base, and pulleys journaled at an intermediate portion of said lift frame and engaging said cables between said drums and said first-named pulleys to exert an upward lifting force at the intermediate portion of said lift frame upon the winding of said cables on said drums.

3. An automotive vehicle lift adapted to be operated by power derived from an automotive vehicle supported thereon comprising a base, front and rear pairs of lift arms pivotally attached to said base and disposed one adjacent each corner of the base, a lift frame pivotally attached to said lift arms and adapted to support an automotive vehicle thereon, rollers journaled on said lift frame for engagement by the driving wheels of a vehicle supported on said lift frame, a pair of drums journaled on said lift frame one at each side thereof adjacent one end of said lift frame, means drivingly connecting said rollers with said drums, a pair of cables each having one end wound upon a corresponding drum, a pair of posts extending upwardly from the end portion of said base remote from said drums, and means connecting the opposite ends of said cables to the upper ends of said posts whereby said cables will exert a lifting force on said lift frame when wound upon said drums.

4. An automotive vehicle lift adapted to be operated by power derived from an automotive vehicle supported thereon comprising an open frame constituting a base, a pair of spaced-apart posts extending upwardly from said base at one end thereof, braces operatively connected between said posts and said base holding said posts substantially perpendicular to said base, lift arms each pivotally connected at one end to said base adjacent a corresponding corner of the base, a lift frame pivotally connected to the opposite ends of said lift arms and comprising a pair of substantially parallel tracks arranged to receive the wheels of an automotive vehicle and having openings therein at the location of the vehicle drive wheels, a transverse shaft journaled on said lift frame, a pair of rollers on said shaft disposed one below each opening in said lift frame for engagement by the vehicle drive wheels, a pair of drums journaled on said lift frame one at each side thereof adjacent the end of said lift frame remote from said posts, reduction gear means drivingly connecting said transverse shaft with said drums, a pulley journaled on the upper end of each post, a pair of cables disposed one at each side of said lift frame each having one end portion wound on the corresponding drum and its opposite end portion carried over the corresponding post-supported pulley, and respective means securing said cables to said posts, said posts being longer than said lift arms to position said cables at an angle to exert a vertical lift component on the end portion of said lift frame remote from said posts when said lift frame is fully lowered.

GROVER A. SIMS.

REFERENCES CITED

The following references are of record in the file of this patent:

UNITED STATES PATENTS

| Number | Name | Date |
|---|---|---|
| 1,080,581 | Preece | Dec. 9, 1913 |
| 1,378,632 | Swope | May 17, 1921 |
| 1,510,328 | Mussina et al. | Sept. 30, 1924 |
| 1,751,874 | Moore | Mar. 25, 1930 |
| 1,774,605 | Leonhard | Sept. 2, 1930 |
| 1,979,788 | Bacher | Nov. 6, 1934 |
| 2,358,501 | Frova | Sept. 19, 1944 |

FOREIGN PATENTS

| Number | Country | Date |
|---|---|---|
| 713,424 | France | Oct. 27, 1931 |